United States Patent
Makita et al.

(10) Patent No.: US 10,767,710 B2
(45) Date of Patent: Sep. 8, 2020

(54) CLUTCH DRIVE UNIT AND STRADDLE TYPE VEHICLE

(71) Applicant: Kabushiki Kaisha F.C.C., Hamamatsu-shi, Shizuoka (JP)

(72) Inventors: Shouji Makita, Shizuoka (JP); Kazuyoshi Miyachi, Shizuoka (JP); Ryouhei Chiba, Shizuoka (JP); Kaoru Iida, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 176 days.

(21) Appl. No.: 15/748,222

(22) PCT Filed: Jun. 17, 2016

(86) PCT No.: PCT/JP2016/068070
§ 371 (c)(1),
(2) Date: Jan. 29, 2018

(87) PCT Pub. No.: WO2017/022343
PCT Pub. Date: Feb. 9, 2017

(65) Prior Publication Data
US 2018/0215258 A1    Aug. 2, 2018

(30) Foreign Application Priority Data
Aug. 6, 2015  (JP) .................... 2015-155756

(51) Int. Cl.
*F16D 29/00* (2006.01)
*F16D 28/00* (2006.01)
(Continued)

(52) U.S. Cl.
CPC ............ *F16D 29/005* (2013.01); *B60K 17/02* (2013.01); *B60K 23/02* (2013.01); *F16D 25/083* (2013.01);
(Continued)

(58) Field of Classification Search
CPC ................. F16D 29/00; F16D 29/005; F16D 25/08–088; F16D 2048/0227;
(Continued)

(56) References Cited

U.S. PATENT DOCUMENTS 4,852,419 A     8/1989   Kittel
5,678,673 A *  10/1997   Borschert ............... F16D 28/00
                                                              192/84.6
(Continued)

FOREIGN PATENT DOCUMENTS

DE    4238368 A1 *  5/1994  ............. F16D 28/00
EP    1669623 A1     6/2006
(Continued)

OTHER PUBLICATIONS

International Search Report dated Sep. 13, 2016 filed in PCT/JP2016/068070.

Primary Examiner — David R Morris
Assistant Examiner — James J Taylor, II
(74) Attorney, Agent, or Firm — Rankin, Hill & Clark LLP (57) ABSTRACT

A clutch drive unit 220 includes a crank arm 221 configured to rotate by rotary driving of a clutch actuator 231. The crank arm 221 includes an output pin 222 configured to press a master cylinder 232, and a receiving pin 223 configured to receive pressing force P from an extendable body 228. The extendable body 228 includes a lock spring 228a with such strength that the pressing force P is generated. The pressing force P allows pressing moment PM greater than reactive force moment RM based on reactive force R acting on the crank arm 221 from a clutch 210 to act on the crank arm 221. The extendable body 228 is, by the stretching force of the lock spring 228a, provided in a stretched state between the receiving pin 223 and a holder receiving pin 229.

8 Claims, 5 Drawing Sheets

(51) Int. Cl.
*B60K 23/02* (2006.01)
*B60K 17/02* (2006.01)
*F16D 25/08* (2006.01)
*F16D 48/02* (2006.01)
*F16D 125/26* (2012.01)

(52) U.S. Cl.
CPC .......... *F16D 28/00* (2013.01); *B60Y 2200/12* (2013.01); *F16D 2025/081* (2013.01); *F16D 2048/0212* (2013.01); *F16D 2125/26* (2013.01)

(58) Field of Classification Search
CPC ..... F16D 2048/0233; F16D 2048/0245; F16D 2048/0248; F16D 2048/0251; F16D 2048/0254; F16D 48/00–10; F16D 25/00–14; F16D 28/00
See application file for complete search history.

(56) References Cited

U.S. PATENT DOCUMENTS

| | | | |
|---|---|---|---|
| 6,026,945 A | 2/2000 | Imao et al. | |
| 6,763,922 B2 * | 7/2004 | Katou | F16D 29/005 192/84.6 |
| 7,690,474 B2 * | 4/2010 | Iwashita | F16D 25/086 180/219 |
| 2006/0169562 A1 | 8/2006 | Kosugi | |
| 2007/0240957 A1 | 10/2007 | Kosugi et al. | |
| 2007/0240958 A1 | 10/2007 | Kosugi | |

FOREIGN PATENT DOCUMENTS

| | | |
|---|---|---|
| JP | H11201188 A | 7/1999 |
| JP | 2007155104 A | 6/2007 |
| JP | 2007285452 A | 11/2007 |

\* cited by examiner

CLUTCH DRIVE UNIT AND STRADDLE TYPE VEHICLE

TECHNICAL FIELD

The present invention relates to a clutch drive unit mounted on a straddle type vehicle such as a motorcycle or a four-wheel buggy car and to a straddle type vehicle including the clutch drive unit.

BACKGROUND ART

Typically, a power transmission device is, at a self-propelled vehicle such as a motorcycle or a four-wheel buggy car, provided for transmitting drive force generated by an engine (a motor) to a drive wheel. The power transmission device is, while being connected or disconnected to/from the crankshaft, a mechanical device configured to change the number of rotations of a crankshaft of the engine to transmit the number of rotations to the drive wheel, and mainly includes a clutch and a transmission.

The clutch described herein is a mechanical device configured to transmit rotary drive force of the crankshaft of the engine to a transmission side while being connected or disconnected to/from the crankshaft. Moreover, the transmission is a mechanical device configured to change the number of rotations of the crankshaft of the engine by a plurality of gear stages formed by a combination of a plurality of gears, thereby transmitting the number of rotations to a drive wheel side.

In this case, the clutch is configured to selectively switch between transmission and blocking of rotary drive force from the engine in such a manner that a clutch drive unit including an electric motor drives a push rod to move back and forth. For example, a clutch actuator as a clutch drive unit disclosed in Patent Literature 1 described below includes an assist spring configured to assist rotary drive force of a clutch motor.

CITATION LIST

Patent Literature

Patent Literature 1: JP-A-2007-285452

However, in the clutch drive unit described in Patent Literature 1 described above, a drive force blocking state (also referred to as "clutch OFF") in a clutch is maintained by continuation of an electric motor rotary driving state, and for this reason, the following problems are caused. Power consumption of an electric motor is great. Further, a high-power electric motor is needed. This leads to an increase in the size and weight of the clutch drive unit.

The present invention has been made to deal with the above-described problems. An object of the present invention is to provide the following clutch drive unit and the following straddle type vehicle including the clutch drive unit. According to this clutch drive unit, power consumption of an electric motor can be reduced, as well as realizing reduction in the size and weight of a device configuration.

SUMMARY OF INVENTION

In order to achieve the above object, a feature of the present invention lies in a clutch drive unit for mutually switching between transmission and blocking of drive force in a clutch of a straddle type vehicle, the vehicle including an engine configured to generate the drive force by fuel combustion, a transmission configured to change, for the drive force of the engine, a rotation speed by a plurality of gear trains forming a plurality of gear stages with different transmission gear ratios from one another, and the clutch configured to selectively switch, by pressing force of a push rod, between transmission and blocking of the drive force from the engine to the transmission, the clutch drive unit including: a clutch actuator including a drive shaft to be rotatably driven; a crank arm to be rotated by the clutch actuator, the crank arm being coupled with the drive shaft; a master cylinder configured to generate hydraulic pressure for pushing the push rod in such a manner that rotation of the crank arm slides an output rod in a cylinder; and an extendable body coupled with a portion of the crank arm with the extendable body being rotatable within a range in a direction in which a pressing direction of an elastic body configured to produce pressing force is toward a center of rotation of the crank arm and a direction against reactive force moment based on reactive force acting on the crank arm from the clutch through each of the push rod and the output rod, and configured to cause pressing moment in a direction opposite to the reactive force moment to act on the crank arm. The extendable body provides the crank arm with the pressing force such that the pressing moment is greater than the reactive force moment.

According to the feature of the present invention configured as described above, the extendable body having the elastic body configured to produce the pressing force is, in the clutch drive unit, rotatably supported within the range in the direction toward the center of rotation of the crank arm and the direction against the reactive force moment based on the reactive force acting on the crank arm from the clutch, and provides the pressing force to the crank arm. In this case, the extendable body provides the crank arm with such pressing force that the pressing moment acting on the crank arm is greater than the reactive force moment. Thus, in the clutch drive unit, the extendable body causes the pressing moment greater than the reactive force moment to act on the crank arm in the direction against the reactive force moment. Consequently, the clutch drive unit can maintain a clutch OFF state (or a clutch ON state) of the clutch even after operation of the clutch actuator has been stopped. As a result, the clutch drive unit can reduce power consumption of the clutch actuator, as well as realizing reduction in the size and weight of the device configuration.

Note that in this case, the clutch has the push rod, and can be configured to transmit the drive force from the engine to the transmission or to block such transmission. The push rod displaces friction plates to be rotatably driven by the drive force transmitted from the engine and clutch plates arranged facing the friction plates to transmit the drive force to the transmission against elastic force of a clutch spring for pushing the friction plates and the clutch plates against each other or separating the friction plates and the clutch plates from each other. In this manner, the push rod separates these plates from each other, or pushes these plates against each other.

Moreover, another feature of the present invention is that in the clutch drive unit, the extendable body also rotates, with respect to the direction in which the pressing direction is toward the center of rotation of the crank arm, in a direction in which the reactive force moment acts.

According to another feature of the present invention configured as described above, the extendable body also rotates, in the clutch drive unit, in the direction in which the reactive force moment acts with respect to the direction in which the extendable body faces toward the center of rotation of the crank arm. Thus, the clutch drive unit can reliably maintain the transmission state (also referred to as "clutch ON") of the clutch even after operation of the clutch actuator has been stopped after transition to the drive force transmission state (also referred to as "clutch ON") in the clutch.

Moreover, still another feature of the present invention is that an angle sensor configured to detect the amount of rotation of the crank arm is, in the clutch drive unit, further provided on the center shaft of rotation of the crank arm.

According to another feature of the present invention configured as described above, the angle sensor configured to detect the amount of rotation of the crank arm is, in the clutch drive unit, provided on the center shaft of rotation of the crank arm. Thus, the level of the drive force transmission state in the clutch (in other words, the level of the blocking state) can be specified by the amount of rotation of the crank arm. Thus, the level of the transmission state can be grasped with a higher resolution in a shorter time, and can be reflected in clutch control.

Moreover, the present invention can be not only implemented as the invention relating to the clutch drive unit, but also can be implemented as the invention relating to a straddle type vehicle including the clutch drive unit.

Specifically, a straddle type vehicle includes an engine configured to generate drive force by fuel combustion, a transmission configured to change, for the drive force of the engine, a rotation speed by a plurality of gear trains forming a plurality of gear stages with different transmission gear ratios from one another, and a clutch configured to selectively switch, by pressing force of a push rod, between transmission and blocking of the drive force from the engine to the transmission. The straddle type vehicle includes a clutch drive unit. The clutch drive unit includes a clutch actuator including a drive shaft to be rotatably driven, a crank arm to be rotated by the clutch actuator, the crank arm being coupled with the drive shaft, a master cylinder configured to generate hydraulic pressure for pushing the push rod in such a manner that rotation of the crank arm slides an output rod in a cylinder, and an extendable body coupled with a portion of the crank arm with the extendable body being rotatable within a range in a direction in which a pressing direction of an elastic body configured to produce pressing force is toward a center of rotation of the crank arm and a direction against reactive force moment based on reactive force acting on the crank arm from the clutch through each of the push rod and the output rod, and configured to cause pressing moment in a direction opposite to the reactive force moment to act on the crank arm, and the extendable body provides the crank arm with the pressing force such that the pressing moment is greater than the reactive force moment. With this configuration, working effects similar to those of the above-described clutch drive unit can be expected as well.

BRIEF DESCRIPTION OF THE DRAWINGS

FIG. 7 is a view for describing the mechanical relationship between the crank arm and the extendable body illustrated in FIG. 3 at the time of a clutch ON.

DESCRIPTION OF EMBODIMENTS

Figure 1:
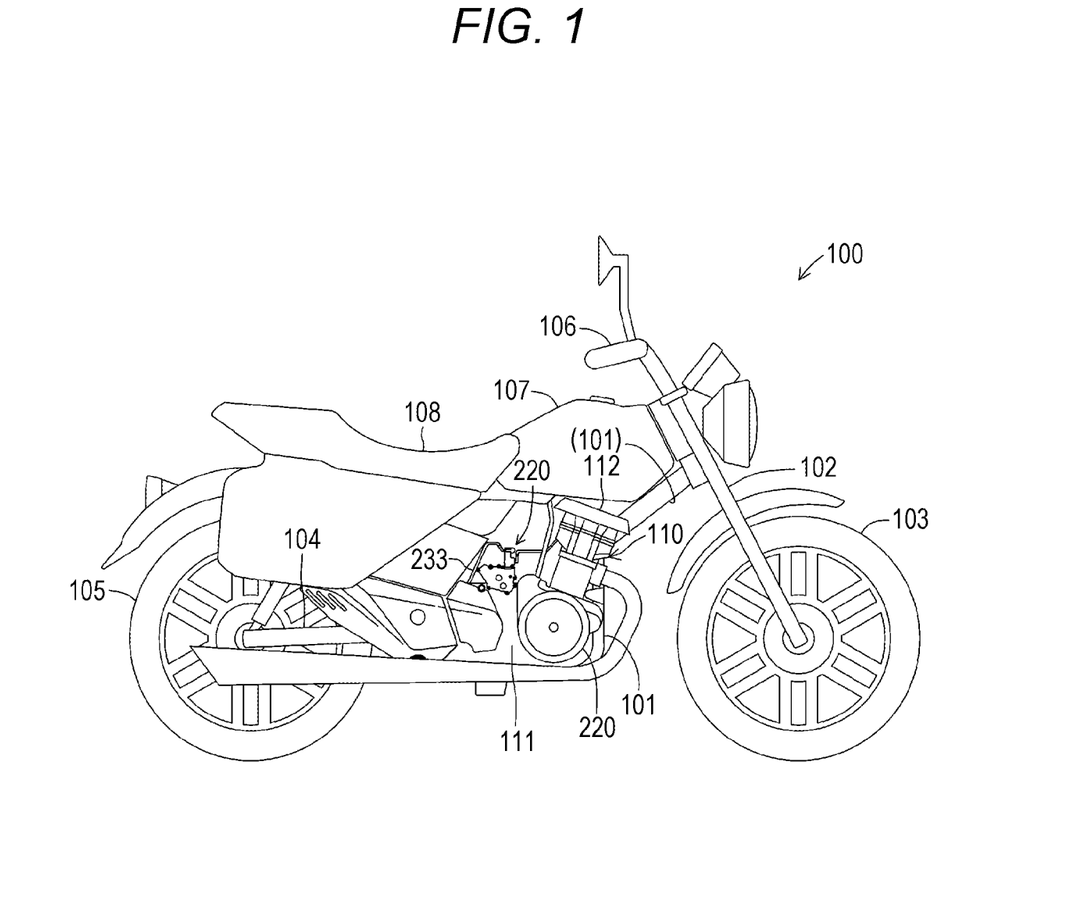
FIG. 1 is a side view of a schematic entire configuration of a straddle type vehicle including a clutch drive unit according to the present invention.
Figure 2:
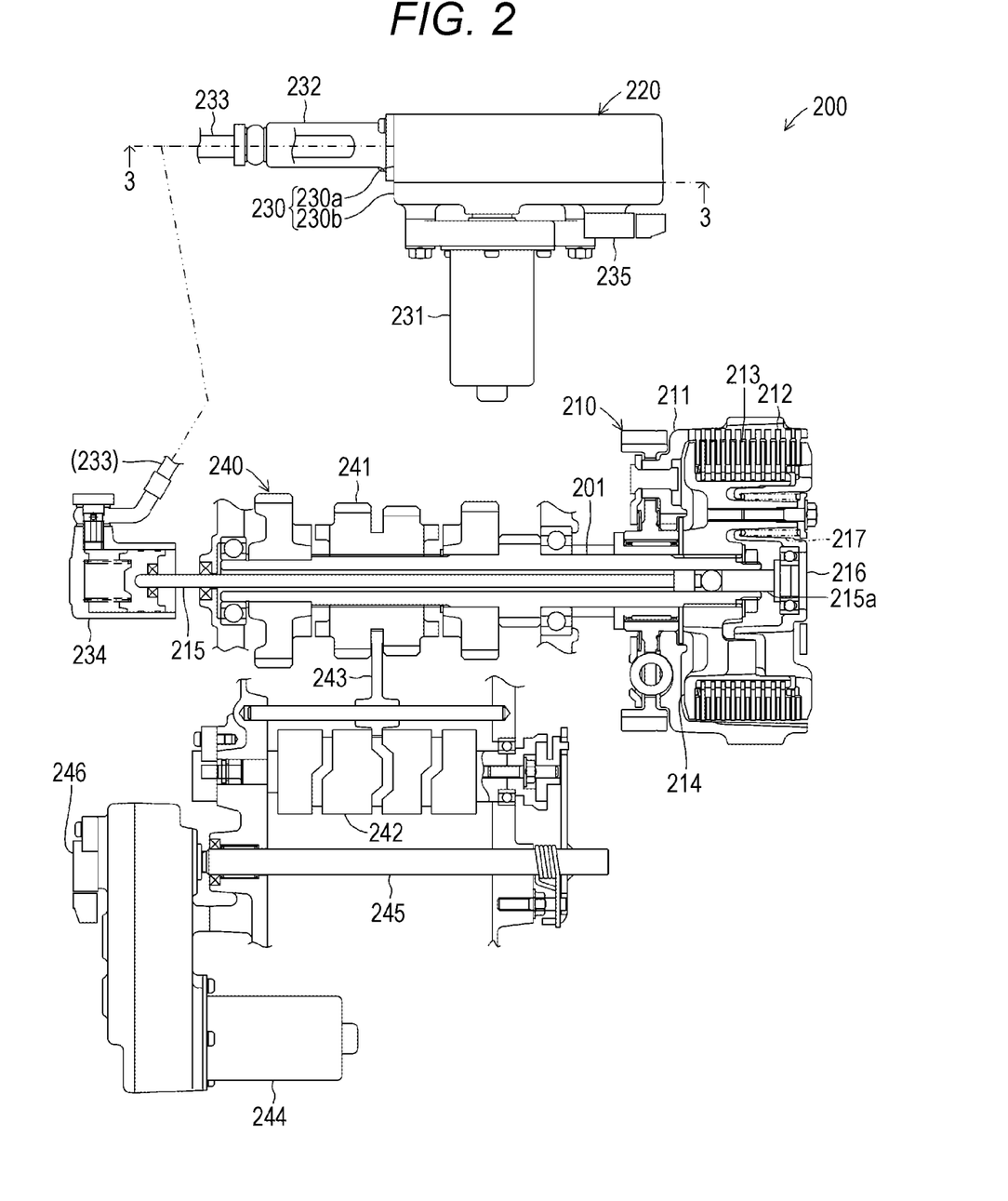
FIG. 2 is a partial sectional view of a schematic configuration of a main portion of a power transmission device in the straddle type vehicle illustrated in FIG. 1.
Figure 3:
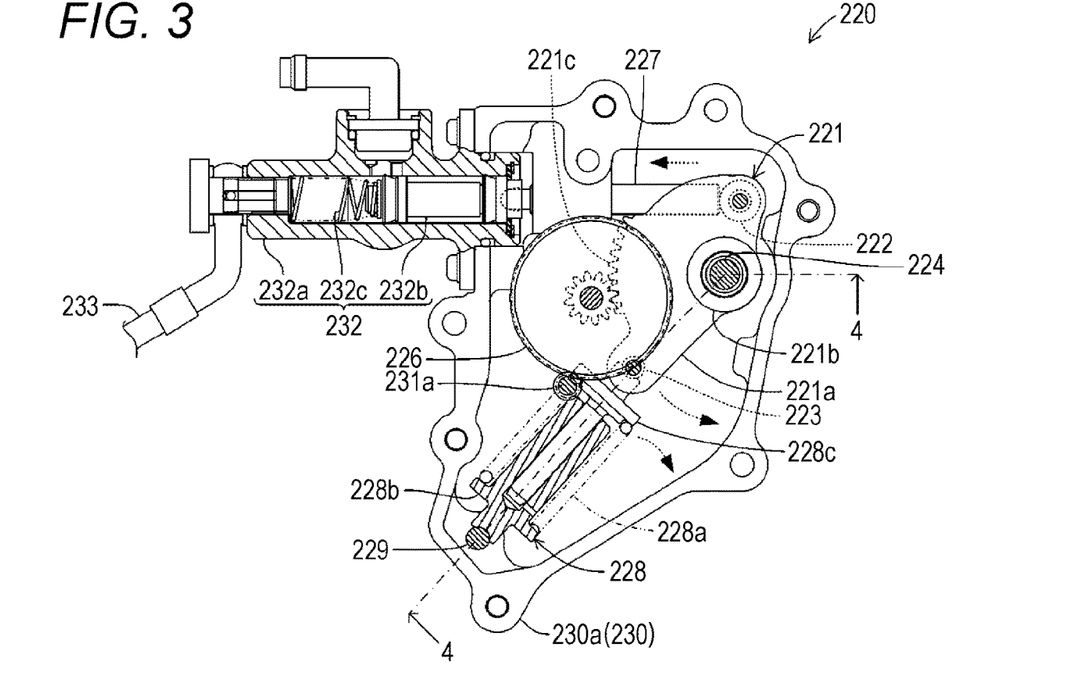
FIG. 3 is a partially-broken sectional view of a schematic internal structure of the clutch drive unit from line 3-3 illustrated in FIG. 2.
Figure 4:
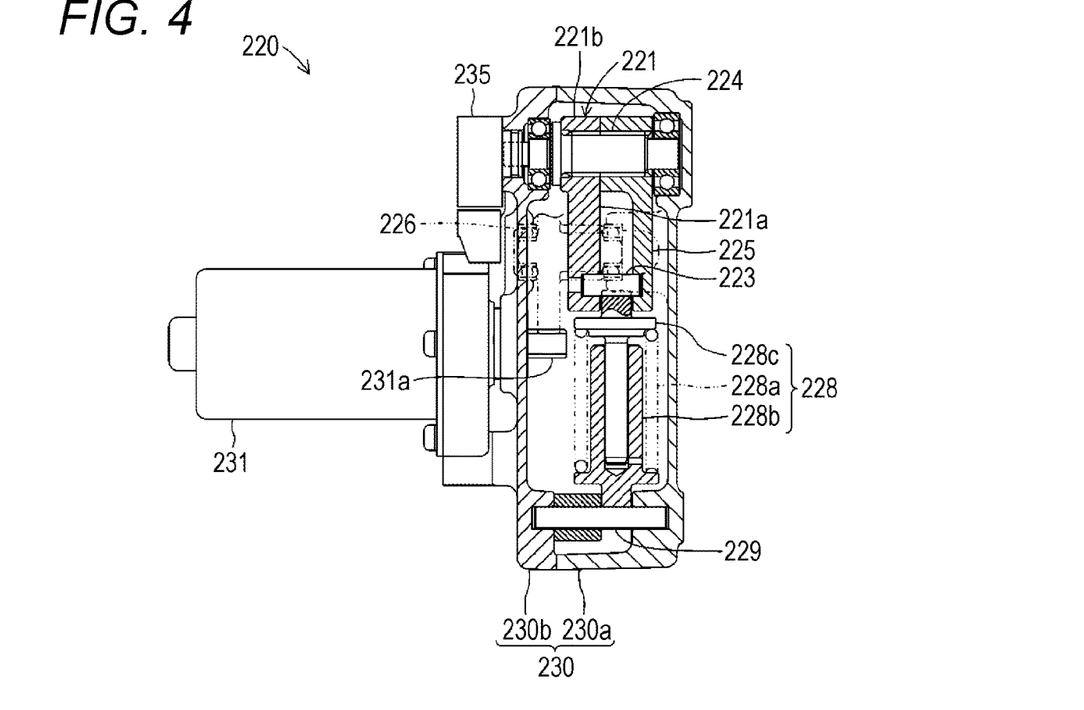
FIG. 4 is a sectional view of the schematic internal structure of the clutch drive unit from line 4-4 illustrated in FIG. 3.

One embodiment of a clutch drive unit and a straddle type vehicle including the clutch drive unit according to the present invention will be described below with reference to the drawings. FIG. 1 is a side view of a schematic entire configuration of a straddle type vehicle 100 including a clutch drive unit 220 according to the present invention. Moreover, FIG. 2 is a partial sectional view of a schematic configuration of a main portion of a power transmission device 200 in the straddle type vehicle 100 illustrated in FIG. 1. Further, FIG. 3 is a sectional view of a schematic internal structure of the clutch drive unit 220 from line 3-3 illustrated in FIG. 2. In addition, FIG. 4 is a sectional view of the schematic internal structure of the clutch drive unit 220 from line 4-4 illustrated in FIG. 3. The straddle type vehicle 100 is a so-called straddle type two-wheel motor vehicle (a so-called motorbike) on which a user rides in a straddling state.

(Configurations of Straddle Type Vehicle 100 and Clutch Drive Unit 220)

The straddle type vehicle 100 is configured such that a front wheel 103 is supported through a front fork 102 at a front end portion of a frame 101 and that a rear wheel 105 is supported through a swing arm 104 at a rear end portion of the frame 101. The frame 101 is formed to extend in a front-to-back direction of the straddle type vehicle 100. In this case, the front fork 102 is formed to rotate relative to the frame 101 in a right-to-left direction of the straddle type vehicle 100. Further, handgrips 106 for steering the straddle type vehicle 100 in a traveling direction thereof are provided at an upper end portion of the front fork 102.

Moreover, in the straddle type vehicle 100, each of a fuel tank 107 and a seat 108 is provided at the rear of the handgrips 106 with the fuel tank 107 and the seat 108 being supported on the frame 101. Further, in the straddle type vehicle 100, each of an engine 110 and the power transmission device 200 is provided below the fuel tank 107 with the engine 110 and the power transmission device 200 being supported on the frame 101.

The engine 110 is a motor configured to generate rotary drive force by fuel combustion. Specifically, the engine 110 is a so-called reciprocating engine. In the engine 110, an air-fuel mixture of fuel and air is introduced into a cylinder (not shown) formed in a tubular shape. This air-fuel mixture is ignited and exploded by an ignition plug (not shown). Accordingly, a piston (not shown) reciprocates in the cylinder such that a crankshaft (not shown) coupled with the piston generates the rotary drive force. The rotary drive force of the crankshaft is transmitted to a clutch 210 of the power transmission device 200 through a primary drive gear attached to an end portion of the crankshaft.

Note that in the present embodiment, the engine 110 is assumed as a so-called four-stroke engine, but needless to say, may be a so-called two-stroke engine. Moreover, in the present embodiment, the engine 110 is assumed as a single-cylinder engine provided with a single cylinder, but needless to say, may be an engine with two or more cylinders.

The crankshaft is housed in a crank case 111. The crank case 111 is an outer housing forming a portion of the engine 110. The crank case 111 holds and houses, in addition to the crankshaft, some components forming the power transmission device 200, such as a transmission 240 and a shift drum 242. This crank case 111 is molded by die casting of aluminum alloy, and is configured separately from a cylinder block 112 configured to house the piston of the engine 110. Note that the crank case 111 may be configured integrally with the cylinder block 112, needless to say.

The power transmission device 200 is a mechanical device configured to perform a gear change by a plurality of gear stages, thereby transmitting the rotary drive force generated by the engine 110. The power transmission device 200 mainly includes the clutch 210 and the transmission 240.

The clutch 210 is arranged between the engine 110 and the transmission 240 on a transmission path of the rotary drive force generated by the engine 110. The clutch 210 is a mechanical device configured to transmit the rotary drive force generated by the engine 110 to the transmission 240 and to block such transmission. As specifically illustrated in FIG. 3, the clutch 210 is provided on one end side (the right side as viewed in the figure) of a main shaft 201 in a shaft shape extending from the transmission 240. The main shaft 201 is a component configured to rotate together with a clutch hub 214 to transmit the rotary drive force to the transmission 240. The main shaft 201 includes a shaft body formed in a hollow shape. Note that hatching is omitted in FIG. 2.

The clutch 210 includes, in a clutch housing 211, a plurality of friction plates 212 and a plurality of clutch plates 213. The clutch housing 211 is made of an aluminum alloy material, and is molded in a cylindrical shape with a bottom. The friction plates 212 and the clutch plates 213 are pressed against each other, or are separated from each other. Each friction plate 212 includes a ring body formed of a steel plate, an outer peripheral portion of the friction plate 212 being radially formed in a recessed-raised shape. Multiple small pieces of a friction material are bonded to both of plate surfaces of each ring body.

On the other hand, each clutch plate 213 includes a ring body formed of a steel plate, an inner peripheral portion of the clutch plate 213 being radially formed in a recessed-raised shape. Of these friction plates 212 and the clutch plates 213, the friction plates 212 are held at the clutch housing 211 to be rotatably driven in association with rotary driving of the engine 110, and the clutch plates 213 are held at the clutch hub 214 coupled with the main shaft 201.

The clutch housing 211 is configured in such a manner that an aluminum material is formed in a cylindrical shape with a bottom. The clutch housing 211 forms a portion of the housing of the clutch 210. Further, the clutch housing 211 holds, on an inner peripheral surface thereof, each of the multiple friction plates 212 by spline fitting in a state in which the friction plates 212 are displaceable along an axial direction of the clutch housing 211 and are rotatable together with the clutch housing 211.

The clutch hub 214 is configured in such a manner that an aluminum material is formed in a substantially flange shape. The clutch hub 214 is arranged concentric with respect to the clutch housing 211. Many spline grooves are formed along an axial direction of the clutch hub 214 at an inner peripheral surface of the clutch hub 214. The main shaft 201 is spline-fitted to the spline grooves. In the hollow portion of the main shaft 201, a push rod 215 is provided to extend in an axial direction of the main shaft 201.

One end side (the left side as viewed in the figure) of the push rod 215 in the main shaft 201 is coupled with the clutch drive unit 220 through a later-described slave cylinder 234. By hydraulic pressure by driving of the clutch drive unit 220, the push rod 215 slides along the axial direction of the main shaft 201 in the hollow portion of the main shaft 201 while pressing a pressure plate 216 through a push member 215a.

The clutch hub 214 holds, on an outer peripheral surface thereof, each of the multiple clutch plates 213 by spline fitting in a state in which adjacent ones of the clutch plates 213 sandwiches the friction plate 212 and the clutch plates 213 are displaceable along the axial direction of the clutch hub 214 and are rotatable together with the clutch hub 214. Moreover, the pressure plate 216 is attached to the clutch hub 214 through a clutch spring 217.

The pressure plate 216 is a component configured to press the friction plates 212 to bring the friction plates 212 and the clutch plates 213 into close contact with each other. The pressure plate 216 is configured in such a manner that an aluminum material is molded in a substantially discoid shape having the substantially same outer diameter as the outer diameter of the clutch plate 213. The clutch spring 217 is an elastic body configured to produce elastic pressing force for pressing the pressure plate 216 toward the clutch hub 214. The clutch spring 217 includes a coil spring (a compression spring) formed in such a manner that spring steel is wound in a spiral shape.

The clutch 210 is filled with a predetermined amount of clutch oil (not shown). The clutch oil is mainly supplied to between the friction plate 212 and the clutch plate 213, thereby preventing absorption of friction heat generated between these plates and abrasion of the friction material. That is, the clutch 210 is a so-called multi-plate wet friction clutch device.

Thus, in the clutch 210, the push rod 215 is pressed to the right side as viewed in the figure by the clutch drive unit 220, so that the friction plates 212 and the clutch plates 213 are separated from each other. In this manner, the clutch 210 is brought into a blocking state in which no drive force of the engine 110 is transmitted to the transmission 240. On the other hand, in the clutch 210, the push rod 215 is pulled in to the left side as viewed in the figure by a clutch actuator 231, so that the friction plates 212 and the clutch plates 213 are pushed against each other. In this manner, the clutch 210 is brought into a connection state in which the drive force of the engine 110 is transmitted to the transmission 240.

The clutch drive unit 220 is a mechanical device configured to press the push rod 215 toward the pressure plate 216 side to switch the state of transmission of the drive force by the clutch 210 to the blocking state. The clutch drive unit 220 includes a crank arm 221.

The crank arm 221 is a component for pressing a piston of a master cylinder 232 described later, and is configured in such a manner that a steel material or a sintered material is formed in a plate shape. More specifically, the crank arm 221 has, at an arm body 221a formed in a plat shape, each of a tubular portion 221b, a tooth portion 221c, an output pin 222, and a receiving pin 223.

The arm body 221a is formed in such a deformed shape that the arm body 221a extends in a plate shape from a portion of an outer peripheral portion of the tubular portion 221b. The tubular portion 221b is a portion configured to rotatably support the crank arm 221 on a unit case 230 through a coupling shaft 224. The tubular portion 221*b* forms a hole penetrating the arm body 221*a*. A spline is formed at an inner peripheral surface of the tubular portion 221*b*, and the coupling shaft 224 is spline-fitted to this spline.

The tooth portion 221*c* is a portion configured to receive the rotary drive force of the clutch actuator 231 through a transmission gear 226. The tooth portion 221*c* is formed such that multiple raised teeth intermittently project along an arc at a portion of an end portion of the arm body 221*a*. In this case, the tooth portion 221*c* is formed to have a length corresponding to the range of rotation of the crank arm 221. The output pin 222 is provided on one side of the tooth portion 221*c* in two rotation directions of the crank arm 221, and the receiving pin 223 is provided on the other side.

The output pin 222 is a circular columnar component configured to press an end portion of an output rod 227. The output pin 222 is configured such that a tubular collar is, in a state in which the output pin 222 is sandwiched between the arm body 221*a* and a pin holding arm 225, rotatably attached to an outer peripheral portion of a round bar-shaped pin body supported in a fixed manner. The receiving pin 223 is a round bar-shaped component configured to receive pressing force from an extendable body 228. Both end portions of the receiving pin 223 are each fitted to the arm body 221*a* and the pin holding arm 225, and are held in a fixed manner. In this case, the receiving pin 223 is provided at a position with a longer distance from the center of the tubular portion 221*b* as the center of rotation of the crank arm 221 than the output pin 222. In other words, such a position is a position on the outside of the output pin 222 with respect to the center of rotation of the crank arm 221.

The coupling shaft 224 is a round bar-shaped component configured to rotatably and integrally hold the crank arm 221 and the pin holding arm 225 on the unit case 230. Both end portions of the coupling shaft 224 are rotatably supported on the unit case 230 through bearings. A spline is formed at an outer peripheral portion of the coupling shaft 224, and each of the crank arm 221 and the pin holding arm 225 is spline-fitted to this spline.

The pin holding arm 225 is a component configured to cooperate with the crank arm 221 to hold the receiving pin 223. The pin holding arm 225 is formed in a plate shape extending parallel to the crank arm 221 from the above-described spline-fitted coupling shaft 224 to sandwich the receiving pin 223. The transmission gear 226 is a mechanical element configured to decelerate the rotary drive force of the clutch actuator 231 to transmit such force to the tooth portion 221*c*. The transmission gear 226 includes a large gear configured to engage with a drive shaft of the clutch actuator 231, and a small gear provided concentric with respect to the large gear and configured to engage with the tooth portion 221*c*. The transmission gear 226 is rotatably supported on the unit case 230. Note that in FIG. 4, a portion of the transmission gear 226 and a portion of the unit case 230 supporting the transmission gear 226 are indicated by chain double-dashed lines.

The output rod 227 is a component configured to press the piston 232*b* of the master cylinder 232, and is configured in such a manner that a steel material is formed in a round bar shape. The output rod 227 is held on the unit case 230 in a state in which the output rod 227 is slidable along a sliding direction of the piston 232*b* of the master cylinder 232. That is, the output rod 227 is arranged between the piston 232*b* of the master cylinder 232 and the output pin 222, thereby transmitting pressing force between both components.

The extendable body 228 is a component configured to cause the output pin 222 to press the piston 232*b* of the master cylinder 232 to maintain a clutch OFF state as the drive force blocking state in the clutch 210. The extendable body 228 mainly includes each of a lock spring 228*a*, a spring holder 228*b*, and a pressing body 228*c*.

The lock spring 228*a* is an elastic body configured to produce elastic pressing force for pushing the pressing body 228*c* against the receiving pin 223, and includes a coil spring (a compression spring) formed in such a manner that spring steel is wound in a spiral shape. In this case, the lock spring 228*a* is set to have such strength that pressing force P allowing pressing moment PM to act on the crank arm 221 is generated. The pressing moment PM is greater than reactive force moment RM based on reactive force R from the clutch 210, the reactive force moment RM acting on the crank arm 221 through each of the push rod 215 and the output rod 227.

The spring holder 228*b* is a component configured to hold the lock spring 228*a* in an extendable state and to hold the pressing body 228*c* in such a state that the pressing body 228*c* is slidable along an extension direction of the lock spring 228*a*. More specifically, the spring holder 228*b* is configured such that a portion of the spring holder 228*b* supporting one end portion of the lock spring 228*a* projects in a flange shape from an outer peripheral portion of a tubular body with a bottom, the tubular body slidably holding the pressing body 228*c*.

The pressing body 228*c* is a component configured to transmit the pressing force of the lock spring 228*a* to the receiving pin 223. More specifically, the pressing body 228*c* is configured such that a portion of the pressing body 228*c* supporting the other end portion of the lock spring 228*a* is formed to project in a flange shape from an outer peripheral portion of a shaft portion sliding in the spring holder 228*b* with the pressing body 228*c* being pushed against the receiving pin 223. Moreover, the extendable body 228 is coupled with the crank arm 221 to rotate about the unit case 230 as the center of rotation.

Specifically, the extendable body 228 is provided such that a tip end portion of the spring holder 228*b* is, by the pressing force of the lock spring 228*a*, rotatably pushed against an outer peripheral surface of a holder receiving pin 229 provided at the unit case 230 and that a tip end portion of the pressing body 228*c* is, by the pressing force of the lock spring 228*a*, pushed against an outer peripheral surface of the receiving pin 223 to slide in a circumferential direction. That is, the extendable body 228 is provided in a stretched state between the receiving pin 223 and the holder receiving pin 229 by the extension force of the lock spring 228*a*.

With this configuration, the extendable body 228 faces in such a direction that a pressing direction of the lock spring 228*a* is toward the center of rotation of the crank arm 221. Further, the extendable body 228 rotates in each of the clockwise and counterclockwise directions with respect to such a direction by an amount corresponding to the amount of rotation of the crank arm 221.

The unit case 230 is a component forming an outer housing of the clutch drive unit 220. The unit case 230 is formed in such a hollow shape that the entirety of each of the crank arm 221, the pin holding arm 225, the transmission gear 226, the output rod 227, and the extendable body 228 is housed. In the present embodiment, the unit case 230 includes a body case 230*a* and a lid case 230*b* molded by die casting of aluminum alloy. The unit case 230 is attached to the frame 101 below the crank case 111 and the seat 108.

The body case 230a is a component configured to support and house each of the crank arm 221, the pin holding arm 225, the transmission gear 226, the output rod 227, and the extendable body 228, and is formed in such a recessed shape that these components can be housed. The lid case 230b is component configured to support each of the crank arm 221, the pin holding arm 225, the transmission gear 226, the output rod 227, and the extendable body 228 while closing an opening portion of the body case 230a. The lid case 230b is formed substantially in such a plate shape that the opening portion of the body case 230a can be covered.

The lid case 230b is attached to the body case 230a with not-shown bolts. Moreover, each of the clutch actuator 231, the master cylinder 232, and an angle sensor 235 is attached to an outer surface of the lid case 230b.

The clutch actuator 231 is a power source configured to switch the state of transmission of the drive force in the clutch 210 to the blocking state. The clutch actuator 231 includes an electric motor whose operation is controlled by a not-shown transmission control unit (TCU). The clutch actuator 231 is attached to the unit case 230 such that a drive gear 231a provided at the drive shaft engages with the transmission gear 226.

The TCU includes a microcomputer with a CPU, a ROM, a RAM, and the like. The TCU is configured to control, in an integrated manner, operation of the power transmission device 200 according to a not-shown control program stored in the ROM and the like in advance. More specifically, the TCU executes control of connection and disconnection of the clutch 210 and control of each type of gear change operation including shift-up and shift-down in the transmission 240. In this case, the TCU controls operation of the clutch actuator 231 by PWM control.

The master cylinder 232 is a mechanical device configured to generate hydraulic pressure for pressing the pressure plate 216 against the elastic force of the clutch spring 217 in the clutch 210. The master cylinder 232 mainly includes each of a cylinder 232a, the piston 232b, and a return spring 232c. The cylinder 232a slidably supports the piston 232b in such a state that hydraulic oil (not shown) supplied from a not-shown reservoir tank and the return spring 232c are housed. The cylinder 232a is connected to the slave cylinder 234 through a pipe 233.

The piston 232b is a round bar-shaped component configured to compress the hydraulic oil in the cylinder 232a. One end portion of the piston 232b faces the hydraulic oil. The other end portion of the piston 232b is connected to the output pin 222. The return spring 232c is a coil spring arranged in the cylinder 232a and configured to push the piston 232b back to the output pin 222 to release a hydraulic oil compression state.

The slave cylinder 234 is hydraulic equipment configured to generate hydraulic pressure based on the hydraulic pressure supplied from the master cylinder 232, thereby pressing the push rod 215 toward the pressure plate 216 side. The angle sensor 235 is a detector configured to detect the rotation angle position of the crank arm 221, thereby outputting such a position to the TCU. The angle sensor 235 is connected to a tip end portion of the coupling shaft 224 penetrating the unit case 230.

The transmission 240 is a mechanical device for performing the gear change by the multiple gear stages (e.g., a five-speed gear change) to transmit the rotary drive force generated from the engine 110 to the rear wheel 105. A plurality of gear trains 241 is provided in the transmission 240. The multiple gear trains 241 form the multiple gear stages with different transmission gear ratios from one another between the main shaft 201 connected to the crankshaft of the engine 110 through the clutch 210 and a not-shown counter shaft extending parallel to the main shaft 201 and connected to the rear wheel 105. That is, in the transmission 240, the gear trains 241 are coupled or separated in a dog clutch manner, thereby forming the gear stages.

For changing each gear stage, the gear trains 241 are recombined by a shift fork 243 in this case. The shift fork 243 reciprocatively displaces along the main shaft 201 and the counter shaft by rotary driving of the shift drum 242. The shift drum 242 is a circular columnar component configured to reciprocatively displace the shift fork 243 along the main shaft 201 and the counter shaft. The shift drum 242 is rotatably driven by a shift actuator 244.

The shift actuator 244 is a drive source configured to rotatably drive the shift drum 242, and includes an electric motor whose operation is controlled by the transmission control unit (TCU). The shift actuator 244 is coupled with the shift drum 242 through a shift shaft 245. Moreover, an angle sensor 246 is provided at the shift drum 242. The angle sensor 246 is configured to detect the rotation angle of the shift drum 242 to output such an angle to the TCU.

(Operation of Straddle Type Vehicle 100 and Clutch Drive Unit 220)

Next, operation of the straddle type vehicle 100 and the clutch drive unit 220 configured as described above will be described. The straddle type vehicle 100 travels while a change in the gear stages in the transmission 240, i.e., shift-up or shift-down, is being performed based on shift operation by a driver and determination by the TCU. Upon such change in the gear stages in the transmission 240, the TCU controls operation of the clutch drive unit 220 to selectively switch the clutch 210 between the drive force transmission state and the drive force blocking state.

Specifically, the TCU rotatably drives the clutch actuator 231 in the direction of generating the hydraulic pressure by the master cylinder 232 in a case where the clutch 210 transitions from the drive force transmission state to the drive force blocking state. Thus, in the clutch drive unit 220, the crank arm 221 rotates, as indicated by a dashed arrow in FIG. 3, counterclockwise (leftward as viewed in the figure) through rotary driving of the transmission gear 226. Accordingly, the output pin 222 presses the output rod 227, and therefore, the hydraulic pressure is generated at the master cylinder 232.

The hydraulic pressure generated at the master cylinder 232 is transmitted to the push rod 215 through the pipe 233 and the slave cylinder 234, thereby displacing the push rod 215 toward the pressure plate 216 side. Thus, the state of close contact among the friction plates 212 and the clutch plates 213 by the pressure plate 216 is released, and the friction plates 212 and the clutch plates 213 are separated from each other. Accordingly, the clutch 210 transitions to the clutch OFF state.

Figure 5:
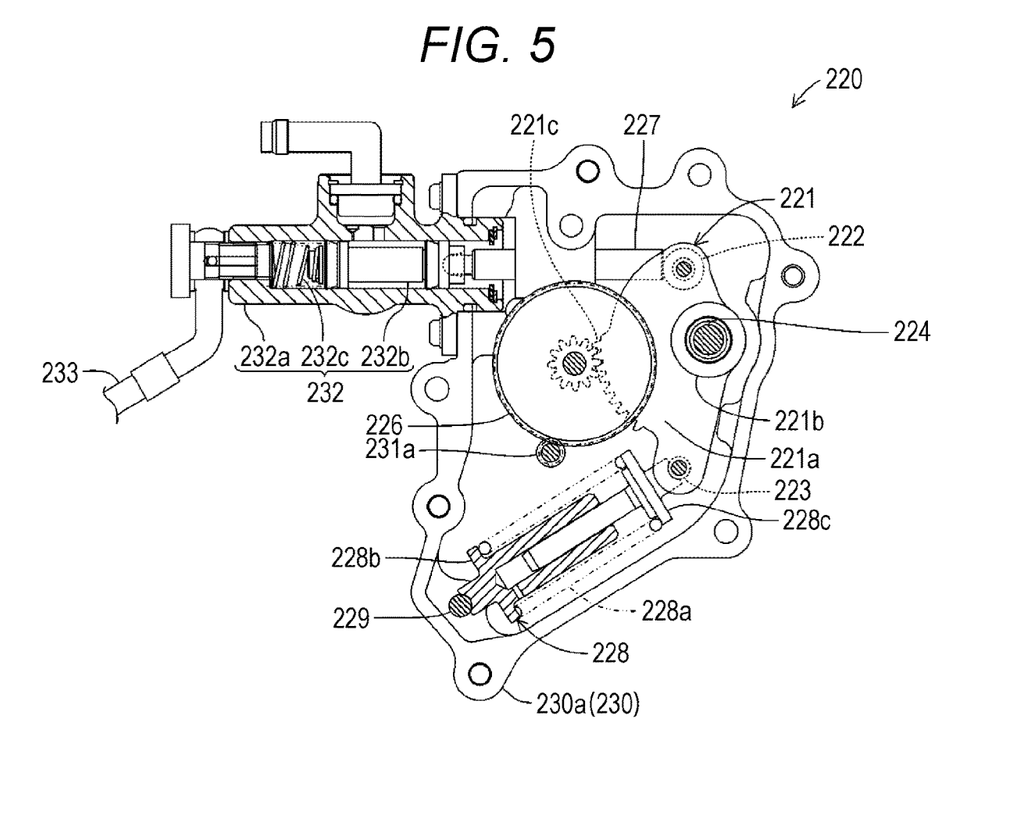
FIG. 5 is a partially-broken sectional view in an operation state when the clutch drive unit illustrated in FIG. 3 causes a clutch OFF.
Figure 6:
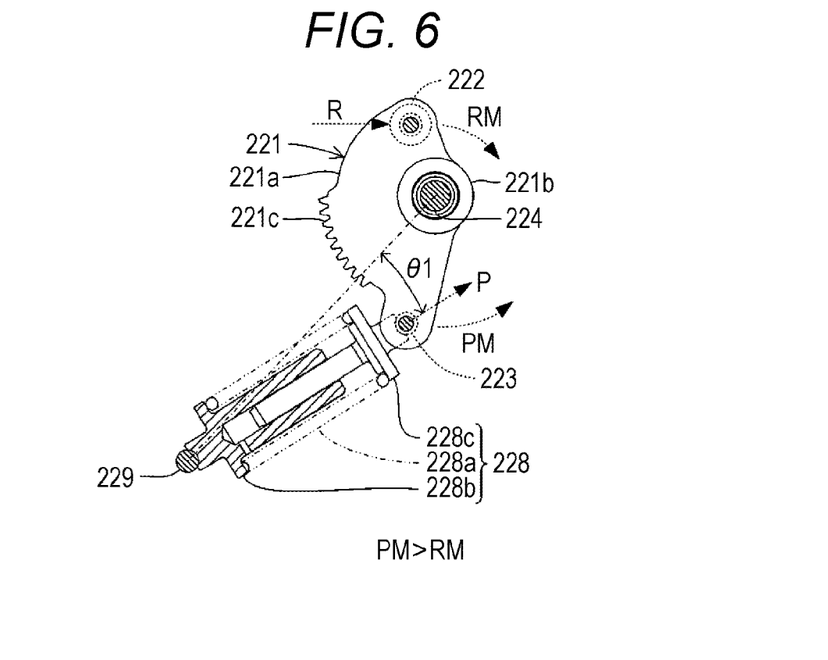
FIG. 6 is a view for describing a mechanical relationship between a crank arm and an extendable body illustrated in FIG. 3 at the time of the clutch OFF.

In this case, the extendable body 228 in the clutch drive unit 220 is coupled with the crank arm 221, and therefore, rotates about the holder receiving pin 229 in association with rotation of the crank arm 221 as illustrated in each of FIGS. 5 and 6. Specifically, the extendable body 228 rotates, with respect to the direction in which the pressing direction of the extendable body 228 is toward the center of rotation of the crank arm 221, in a direction against (toward) the direction of action of the reactive force moment RM acting on the crank arm 221. Thus, in a rotation process, in a case where the crank arm 221 rotates in the rotation direction thereof with respect to the direction in which the pressing direction of the extendable body 228 is toward the center of rotation of the crank arm 221, the pressing moment PM in the same direction as the rotation direction of the crank arm 221 acts on the crank arm 221. The pressing moment PM is generated by a component of the pressing force P of the extendable body 228, the component acting in the direction of tangent of the rotation direction of the crank arm 221.

Thus, in the clutch actuator 231, a burden against the reactive force R acting on the crank arm 221 from the clutch 210, specifically a burden against the reactive force moment RM based on the elastic force of the clutch spring 217, is reduced. The TCU drives the clutch actuator 231 until the crank arm 221 reaches the rotation limit thereof, i.e., until the crank arm 221 reaches such a rotation position that the clutch 210 is fully brought into the clutch OFF, and then, stops the clutch actuator 231.

While the crank arm 221 is rotating, the pressing moment PM acting on the crank arm 221 increases as the crank arm 221 rotates. The pressing moment PM becomes maximum when the crank arm 221 reaches the rotation limit thereof (θ1 in FIG. 6) and the clutch 210 is brought into the clutch OFF. In this case, the extendable body 228 includes the lock spring 228a configured to produce the pressing force P for generating the pressing moment PM at the crank arm 221. The pressing moment PM acts in the direction opposite to the reactive force moment RM acting on the crank arm 221, and is greater than the reactive force moment RM.

In other words, the extendable body 228 includes the lock spring 228a configured to produce greater pressing force than force for contracting the lock spring 228a of the extendable body 228 by the crank arm 221 by means of the pressing force of the clutch spring 217 of the clutch 210. Thus, the clutch drive unit 220 can maintain the state of pressing the master cylinder 232 by the pressing force P of the extendable body 228 even in a case where rotary driving of the clutch actuator 231 is stopped. Note that in this case, the force acting on the crank arm 221 through the output rod 227 also includes, needless to say, other types of force than the force of the clutch spring 217, such as the reactive force of the return spring 232c.

Next, in the case of causing the clutch 210 to transition to the drive force transmission state, the TCU rotatably drives the clutch actuator 231 in the direction of releasing the hydraulic pressure generated by the master cylinder 232, i.e., in the opposite direction of the above-described direction. Thus, in the clutch drive unit 220, the crank arm 221 rotates clockwise (rightward as viewed in the figure) through rotary driving of the transmission gear 226. Accordingly, the force of pressing the output rod 227 by the output pin 222 is weakened, and therefore, the hydraulic pressure generated by the master cylinder 232 is released.

Thus, the pressure plate 216 brings, by the pressing force of the clutch spring 217, the friction plates 212 and the clutch plates 213 into close contact with each other, and the clutch 210 transitions to a clutch ON state. Further, the push rod 215 retracts toward the slave cylinder 234 side.

In this case, the extendable body 228 in the clutch drive unit 220 is coupled with the crank arm 221, and therefore, rotates toward the side in which the pressing direction of the extendable body 228 is toward the center of rotation of the crank arm 221. Accordingly, the pressing moment acting on the crank arm 221 decreases as the crank arm 221 rotates. This pressing moment becomes minimum ("zero" in theory) when the crank arm 221 is in the direction in which the pressing direction of the extendable body 228 is toward the center of rotation of the crank arm 221.

Figure 7:
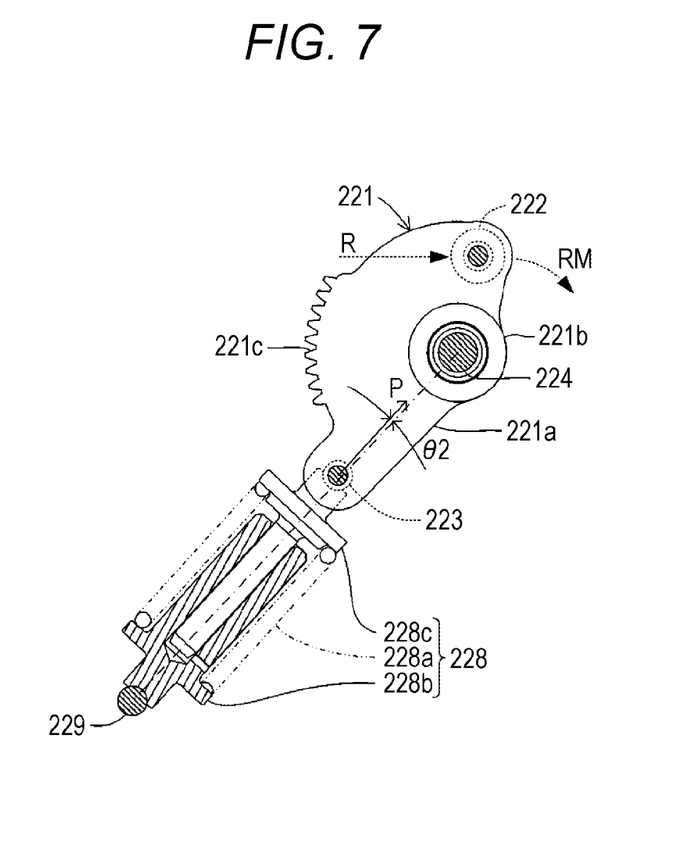

As illustrated in FIG. 7, the TCU drives the clutch actuator 231 until the crank arm 221 reaches the rotation limit thereof (θ2 in FIG. 7), i.e., until the crank arm 221 reaches such a rotation position that the clutch 210 is turned to the clutch ON, and then, stops the clutch actuator 231. In this case, the extendable body 228 is at a position having rotated, with respect to the direction in which the pressing direction of the extendable body 228 is toward the center of rotation of the crank arm 221, in a direction along (following) the action direction of the reactive force moment RM acting on the crank arm 221. Thus, the clutch drive unit 220 can reliably maintain the transmission state (also referred to as "clutch ON") of the clutch even after operation of the clutch actuator has been stopped after transition to the drive force transmission state in the clutch 210. The clutch drive unit 220 starts, in subsequent clutch OFF operation, rotating from the position having rotated in the side along the action direction of the reactive force moment RM, to the side in which the pressing direction is a direction toward the center of rotation of the crank arm 221.

Upon such switching operation between the drive force transmission state and drive force blocking state of the clutch 210, the TCU can grasp the level of the drive force transmission state and drive force blocking state of the clutch 210 based on a detection signal of the angle sensor 235 connected to the coupling shaft 224. Thus, as compared to the case of detecting the drive force transmission state and drive force blocking state of the clutch 210 by a detector provided at the clutch 210 side, the TCU can grasp the level of the transmission state with a higher resolution in a shorter time, thereby reflecting such a state in clutch control.

As will be also understood from operation description described above, according to the above-described embodiment, the extendable body 228 having the elastic body configured to produce the pressing force P is, in the clutch drive unit 220, rotatably supported within the range in the direction toward the center of rotation of the crank arm 221 and the direction against the reactive force moment RM based on the reactive force R acting on the crank arm 221 from the clutch 210, and therefore, provides the pressing force P to the crank arm 221. In this case, the extendable body 228 provides the crank arm 221 with such pressing force P that the pressing moment PM acting on the crank arm 221 is greater than the reactive force moment RM. Thus, in the clutch drive unit 220, the extendable body 228 causes the pressing moment PM greater than the reactive force moment RM to act on the crank arm 221 in the direction against the reactive force moment RM. Consequently, the clutch drive unit 220 can maintain the clutch OFF state of the clutch 210 even after operation of the clutch actuator 231 has been stopped. As a result, the clutch drive unit 220 can reduce power consumption of the clutch actuator 231, as well as realizing reduction in the size and weight of the device configuration.

Further, implementation of the present invention is not limited to the above-described embodiment, and various changes can be made without departing from the object of the present invention.

For example, in the above-described embodiment, the clutch drive unit 220 is configured such that when the clutch 210 is in the clutch ON state, the pressing force P of the extendable body 228 is at the position (θ2 in FIG. 7) having rotated to the downstream side in action of the reactive force moment RM with respect to the direction in which the pressing force P of the extendable body 228 is toward the center of rotation of the crank arm 221. However, the clutch drive unit 220 can be configured such that when the clutch 210 is in the clutch ON state, the pressing force P of the extendable body 228 is positioned in the direction in which the pressing force P of the extendable body 228 is toward the center of rotation of the crank arm 221 or the pressing force P of the extendable body 228 is at a position having rotated to the upstream side (a θ1 side in FIG. 6) in action of the reactive force moment RM with respect to the direction in which the pressing force P of the extendable body 228 is toward the center of rotation of the crank arm 221. In this case, the clutch drive unit 220 can maintain the clutch ON state by the reactive force R from the clutch 210 side.

Moreover, in the above-described embodiment, the TCU can grasp the level of the drive force transmission state and drive force blocking state of the clutch 210 based on the detection signal of the angle sensor 235 connected to the coupling shaft 224. However, the angle sensor 235 may be at such a position that the rotation angle of the crank arm 221 can be detected. Thus, the angle sensor 235 may be provided at other locations than the coupling shaft 224, such as a drive shaft of the transmission gear 226 or the clutch actuator 231. Alternatively, the angle sensor 235 can be omitted from the clutch drive unit 220 in the case of providing the angle sensor 235 at the clutch 210 side.

Further, in the above-described embodiment, the clutch 210 is configured such that the push rod 215 presses the pressure plate 216 to block transmission of the drive force from the engine 110. However, the clutch 210 can be configured such that the push rod 215 presses the pressure plate 216 to transmit the drive force from the engine 110.

In addition, in the above-described embodiment, the extendable body 228 has the lock spring 228a including the coil spring. However, the extendable body 228 may be rotatably provided at the crank arm 221 within the range in the direction in which the pressing direction of the pressing force P is toward the center of rotation of the crank arm 221 and the direction against the reactive force moment RM based on the reactive force R acting on the crank arm 221 from the clutch 210, and may have the elastic body configured to cause the pressing moment PM greater than the reactive force moment RM to act on the crank arm 221 in the opposite direction of the reactive force moment RM. Thus, the extendable body 228 can include, instead of the lock spring 228a, a hydraulic cylinder or an air cylinder.

In addition, in the above-described embodiment, the straddle type vehicle 100 is configured as the two-wheel motor vehicle (the so-called motorbike). However, the straddle type vehicle 100 can be broadly applied to self-propelled vehicles in a form in which a user is seated on the seat 108 in a straddling state. Thus, the straddle type vehicle 100 is also applicable to a four-wheel buggy.

DESCRIPTION OF REFERENCE SIGNS

100 Straddle type vehicle
101 Frame
102 Front fork
103 Front wheel
104 Swing arm
105 Rear wheel
106 Handgrip
107 Fuel tank
108 Seat
110 Engine
111 Crank case
112 Cylinder block
200 Power transmission device
201 Main shaft
210 Clutch
211 Clutch housing
212 Friction plate
213 Clutch plate
214 Clutch hub
215 Push rod
215a Push member
216 Pressure plate
217 Clutch spring
220 Clutch drive unit
221 Crank arm
221a Arm body
221b Tubular portion
221c Tooth portion
222 Output pin
223 Receiving pin
224 Coupling shaft
225 Pin holding arm
226 Transmission gear
227 Output rod
228 Extendable body
228a Lock spring
228b Spring holder
229 Holder receiving pin
230 Unit case
230a Body case
230b Lid case
231 Clutch actuator
232 Master cylinder
232a Cylinder
232b Piston
232c Return spring
233 Pipe
234 Slave cylinder
235 Angle sensor
240 Transmission
241 Gear train
242 Shift drum
243 Shift fork
244 Shift actuator
245 Shift shaft
246 Angle sensor

The invention claimed is:

1. A clutch drive unit for mutually switching between transmission and blocking of drive force in a clutch of a straddle type vehicle, the vehicle including
an engine configured to generate the drive force by fuel combustion,
a transmission configured to change, for the drive force of the engine, a rotation speed by a plurality of gear trains forming a plurality of gear stages with different transmission gear ratios from one another, and
the clutch configured to selectively switch, by pressing force of a push rod, between transmission and blocking of the drive force from the engine to the transmission,
the clutch drive unit comprising:
a clutch actuator including a drive shaft to be rotatably driven;
a transmission gear including a large gear configured to engage with the drive shaft and a small gear provided concentric with respect to the large gear;
a crank arm comprising a tooth portion engaged with the small gear and configured to be rotated by a drive force of the clutch actuator transmitted from the transmission gear, the crank arm being coupled with the drive shaft;
an output pin provided on one side of the crank arm, the output pin configured to press an output rod;

a receiving pin provided on other side of the crank arm and at a position with a longer distance from a center of rotation of the crank arm than a distance between the output pin and the center of rotation of the crank arm;
a master cylinder configured to generate hydraulic pressure for pushing the push rod, the hydraulic pressure being generated by rotation of the crank arm which causes the output pin to press the output rod and to slide the output rod in a cylinder; and
an extendable body
comprising an elastic body configured to produce pressing force toward the center of rotation of the crank arm, and
rotatable about a holder receiving pin contacting one end of the extendable body while other end of the extendable body is in contact with the receiving pin, within a range of an angle θ2 at which a pressing direction of the pressing force of the elastic body is toward the center of rotation of the crank arm and an angle θ1 at which the pressing direction of the pressing force of the elastic body is against reactive force moment based on reactive force acting on the crank arm from the clutch through each of the push rod and the output rod, to cause pressing moment in a direction opposite to the reactive force moment to act on the crank arm, wherein
the extendable body provides the crank arm with the pressing force of the elastic body such that the pressing moment is greater than the reactive force moment, and
the distance between the center of rotation of the crank arm and the output pin is shorter than a distance between the center of rotation of the crank arm and a center of rotation of the transmission gear.

2. The clutch drive unit according to claim 1, wherein the angle θ1 is an angle of rotation in a direction against an acting direction of the reactive force moment.

3. The clutch drive unit according to claim 1, wherein an angle sensor configured to detect an amount of rotation of the crank arm is further provided on a center shaft of rotation of the crank arm.

4. A straddle type vehicle including
an engine configured to generate drive force by fuel combustion,
a transmission configured to change, for the drive force of the engine, a rotation speed by a plurality of gear trains forming a plurality of gear stages with different transmission gear ratios from one another, and
a clutch configured to selectively switch, by pressing force of a push rod, between transmission and blocking of the drive force from the engine to the transmission,
the straddle type vehicle comprising
a clutch drive unit, wherein
the clutch drive unit includes
a clutch actuator including a drive shaft to be rotatably driven,
a transmission gear including a large gear configured to engage with the drive shaft and a small gear provided concentric with respect to the large gear,
a crank arm comprising a tooth portion engaged with the small gear and configured to be rotated by a drive force of the clutch actuator transmitted from the transmission gear, the crank arm being coupled with the drive shaft,
an output pin provided on one side of the crank arm, the output pin configured to press an output rod,
a receiving pin provided on other side of the crank arm and at a position with a longer distance from a center of rotation of the crank arm than a distance between the output pin and the center of rotation of the crank arm,
a master cylinder configured to generate hydraulic pressure for pushing the push rod, the hydraulic pressure being generated by rotation of the crank arm which causes the output pin to press the output rod and to slide the output rod in a cylinder, and
an extendable body
comprising an elastic body configured to produce pressing force toward the center of rotation of the crank arm, and
rotatable about a holder receiving pin contacting one end of the extendable body while other end of the extendable body is in contact with the receiving pin, within a range of an angle θ2 at which a pressing direction of the pressing force of the elastic body is toward the center of rotation of the crank arm and an angle θ1 at which the pressing direction of the pressing force of the elastic body is against reactive force moment based on reactive force acting on the crank arm from the clutch through each of the push rod and the output rod, to cause pressing moment in a direction opposite to the reactive force moment to act on the crank arm,
the extendable body provides the crank arm with the pressing force of the elastic body such that the pressing moment is greater than the reactive force moment, and
the distance between the center of rotation of the crank arm and the output pin is shorter than a distance between the center of rotation of the crank arm and a center of rotation of the transmission gear.

5. The clutch drive unit according to claim 2, wherein an angle sensor configured to detect an amount of rotation of the crank arm is further provided on a center shaft of rotation of the crank arm.

6. The clutch drive unit according to claim 1, wherein the pressing moment becomes maximum when the crank arm reaches a rotation limit and the clutch is brought into the clutch OFF.

7. The clutch drive unit according to claim 1, wherein the pressing moment becomes minimum when the crank arm is in a direction in which the pressing direction of the extendable body is toward the center of rotation of the crank arm.

8. The clutch drive unit according to claim 1, wherein the crank arm comprises:
an arm body having a plate shape; and
the tooth portion at the arm body, the tooth portion configured to receive a rotary drive force of the clutch actuator, and
the tooth portion comprises multiple raised teeth intermittently project along an arc at a portion of an end portion of the arm body, and the tooth portion has a length corresponding to a rotation range of the crank arm.

* * * * *